US010054302B2

(12) United States Patent
Wittmann

(10) Patent No.: US 10,054,302 B2
(45) Date of Patent: Aug. 21, 2018

(54) OPERATING DEVICE AND COMMUNICATIONS ADAPTER FOR OUTDOOR USE

(71) Applicant: TRIDONIC GMBH & CO KG, Dornbirn (AT)

(72) Inventor: Gerhard Wittmann, München (DE)

(73) Assignee: TRIDONIC GMBH & CO KG, Dornbirn (AT)

( * ) Notice: Subject to any disclaimer, the term of this patent is extended or adjusted under 35 U.S.C. 154(b) by 101 days.

(21) Appl. No.: 15/110,532

(22) PCT Filed: Jan. 7, 2015

(86) PCT No.: PCT/EP2015/050144
§ 371 (c)(1),
(2) Date: Jul. 8, 2016

(87) PCT Pub. No.: WO2015/104279
PCT Pub. Date: Jul. 16, 2015

(65) Prior Publication Data
US 2016/0327255 A1 Nov. 10, 2016

(30) Foreign Application Priority Data
Jan. 10, 2014 (DE) ........................ 10 2014 200 297

(51) Int. Cl.
*H05B 37/02* (2006.01)
*F21V 23/00* (2015.01)
(Continued)

(52) U.S. Cl.
CPC .......... *F21V 23/008* (2013.01); *F21V 31/005* (2013.01); *H05B 33/08* (2013.01);
(Continued)

(58) Field of Classification Search
CPC ............ H05B 37/0227; H05B 37/0245; H05B 37/0254; H05B 37/0263; H05B 37/0272
(Continued)

(56) References Cited

U.S. PATENT DOCUMENTS 6,424,096 B1 * 7/2002 Lowe ................ H05B 37/0272 315/185 R
2009/0278479 A1 * 11/2009 Platner ............... H05B 37/0245 315/312
(Continued)

FOREIGN PATENT DOCUMENTS

AT 11444 10/2010
AT 14261 7/2015
(Continued)

OTHER PUBLICATIONS

International Search Report in parent application, PCT/EP2015/050144, dated Mar. 12, 2015.
(Continued)

*Primary Examiner* — Tung X Le
(74) *Attorney, Agent, or Firm* — Andrus Intellectual Property Law

(57) ABSTRACT

One aspect of the invention provides a housed operating device for operating lighting means, preferably LEDs, said housing which is preferably sealed against humidity having means for the mechanical positioning and/or mounting of at least one communications adapter, the means being arranged on the housing such that a positioned and/or mounted communications adapter is wirelessly supplied with energy through the housing wall and communicates with an interface inside the housing.

27 Claims, 2 Drawing Sheets

(51) Int. Cl.

| | |
|---|---|
| ***H05B 33/08*** | (2006.01) |
| ***F21V 31/00*** | (2006.01) |
| *F21Y 115/10* | (2016.01) |
| *F21W 131/103* | (2006.01) |
| *F21W 131/107* | (2006.01) |

(52) U.S. Cl.
CPC ......... *H05B 33/0845* (2013.01); *H05B 37/02* (2013.01); *H05B 37/0254* (2013.01); *H05B 37/0263* (2013.01); *H05B 37/0272* (2013.01); *F21W 2131/103* (2013.01); *F21W 2131/107* (2013.01); *F21Y 2115/10* (2016.08)

(58) Field of Classification Search
USPC .......................................... 315/152, 307, 312
See application file for complete search history.

(56) References Cited

U.S. PATENT DOCUMENTS

| | | | | |
|---|---|---|---|---|
| 2012/0038281 | A1 | 2/2012 | Verfuerth | |
| 2012/0038490 | A1 | 2/2012 | Verfuerth | |
| 2012/0086561 | A1* | 4/2012 | Ilyes | H05B 37/0227 340/12.32 |
| 2013/0038216 | A1* | 2/2013 | Hao | H05B 37/0272 315/132 |
| 2014/0022940 | A1* | 1/2014 | Apte | G01S 1/68 370/254 |
| 2017/0339774 | A1* | 11/2017 | Wang | H05B 37/029 |

FOREIGN PATENT DOCUMENTS

| | | |
|---|---|---|
| DE | 102012208267 | 12/2013 |
| EP | 2663164 | 11/2013 |
| GB | 2202414 | 9/1998 |
| WO | 2004057927 | 7/2004 |
| WO | 2005117503 | 12/2005 |
| WO | 2006129227 | 12/2006 |
| WO | 2010108062 | 9/2010 |
| WO | 2013016534 | 1/2013 |
| WO | 2013132416 | 9/2013 |
| WO | 2013164251 | 11/2013 |

OTHER PUBLICATIONS

Austrian Search Report in Austria patent application GM 8/2014 dated Jan. 8, 2015.

* cited by examiner

OPERATING DEVICE AND COMMUNICATIONS ADAPTER FOR OUTDOOR USE

CROSS REFERENCE TO RELATED APPLICATION

The present application is the U.S. national stage application of International Application PCT/EP2015/050144, filed Jan. 7, 2015, which international application was published on Jul. 16, 2015 as International Publication WO 2015/104279 A1. The International Application claims priority of German Patent Application 10 2014 200 297.4, filed Jan. 10, 2014.

FIELD OF THE INVENTION

The invention relates to an operating device for operating at least one light source, preferably an LED, and in particular to an operating device in a housing. The invention furthermore relates to a lamp with an operating device according to the invention, to a communications adapter and a system made up of an operating device and a communications adapter.

The operating device can be a ballast unit or an LED driver. In accordance with the invention, the operating device is preferably used outdoors, thus in particular outside and can be used e.g. in street lights, for the outside illumination of buildings, etc. The operating device can hereby operate at least one light source in a dimmable manner, and the operating device can in particular dim the at least one light source on command.

BACKGROUND OF THE INVENTION

When electronic devices are designed for outdoor use, it is reasonable to equip such devices with a housing that is fully closed so that no moisture or dust can penetrate into the electronic device.

According to the prior art, such an operating device is arranged with components by means of which the operating device is supplied with power or can be controlled. The controls or supply for the components is hereby accomplished by means of a wiring, which bears a disadvantage in that contact ports or terminals, sockets or connectors for the electric connection of the components with the operating device in or at the housing need to be provided.

Thus, the susceptibility to errors is increased on the one hand, since moisture can penetrate into the housing, which can lead to failures, e.g. due to a formation of electrical bridges. On the other hand the lifespan might be affected, since there might be e.g. increased wear at the contacts that are placed on the outside, e.g. by means of corrosion. It is also not possible to achieve high IP protection classes (International Protection Codes according to DIN 40 O50 part 9 and/or DIN EN 60529), e.g. protection class IP 66, 67 or 68).

A purpose of the invention therefore is that the communication and/or the power supply of the components that are supplied by the operating device would at least partially be performed in a wireless manner and in particular by means of using near field communication technologies (NFC) or short-range wireless technologies (e.g. Bluetooth, Bluetooth LE (low energy), ZigBee, . . . ). In particular communication adapters can be connected to the operating device in a functional manner in this way.

SUMMARY OF THE INVENTION

The invention thus provides an operating device and communications adapter which reduces the problems of the prior art. The invention also provides a system that is made up of an operating device and a communications adapter as well as a lamp with an operating device according to the invention.

In a first aspect, an encased operating device for the operation of light sources, preferably of LEDs, is provided, whereby the housing that is preferably sealed against moisture is supplied with means for a mechanical positioning and/or with mounting brackets for at least one communications adapter, whereby the means are arranged on the housing in such a way that a positioned or mounted communications adapter can communicate wirelessly through the housing wall with an interface that is within the housing.

The operating device can supply electric power to the at least one communications adapter in a wireless manner, in particular via the interface, particularly without any direct contact and/or in an inductive manner.

In order to communicate with the at least one communications adapter, the operating device can receive data from the at least one communications adapter and/or transmit data to the at least one communications adapter.

The operating device can communicate with the at least one communications adapter when the at least one communications adapter is supplied with power in a wireless manner by means using the wireless supply, in particular by varying or modulating the wireless supply.

The operating device can communicate with the at least one communications adapter via a radio frequency and preferably wireless.

The means can be designed in such a way that the at least one communications adapter can be positioned at the operating device in a mechanically defined way, in particular by means of plug-, snapping-, clamping-, adhesive- and/or magnetic connections to the housing.

The operating device and the power lines that supply the operating device can at least partially be molded with the sealing compound, and whereby the housing is at least partially shaped by the sealing compound.

The housing of the operating device can be sealed hermetically, especially water- or air-tight.

The operating device can communicate with other operating devices and in particularly with other bus modules, like e.g. in a light management system, via the power lines that are supplying the operating device, in particular by means of power line communication, PLC.

The operating device can consist of a bus interface for the communication with a bus and/or a supply interface.

The operating device can consist of a control unit and an antenna for the uni- or bi directional communication with the at least one communications adapter.

The operating device may consist of a further communication interface, and can particularly transmit and/or receive wireless information, in particular maintenance and/or configuration data via the further communication interface. The operating device can further evaluate the data received via the communication interface by means of the control unit, and the control unit can configure the operating device accordingly.

The operating device can be an electronic ballast unit or an LED converter.

In another aspect, a lamp is provided with the operating device.

In yet another aspect, a communications adapter is provided which preferably consist of a housing that is sealed against moisture and that is equipped with means for a mechanical positioning at the operating device, whereby the communications adapter consists of an interface that is designed to communicate with an operating device interface within the housing of the operating device in a wireless manner.

The communications adapter can particularly be supplied by the operating device via the at least one interface or one supply interface in a wireless manner, particularly without any direct contact and/or in an inductive manner.

In order to communicate with the at least one operating device, the communications adapter can receive data from the at least one operating device and/or transmit data to the at least one operating device.

A programming device can also be connected to the communications adapter, in order to e.g. update the firmware of the operating device (modification or supplement of the operational behavior, e.g. of the control or detection of new errors, or extension of the command set with regards to new functions of the operation and of the service) or in order to adjust operational parameters.

The communications adapter can communicate with the operating device via a wireless electrical supply from the operating device in particular by means of variating or modulating of the wireless supply.

The communications adapter can communicate with the at least one operating device by means of a wireless supply via a radio frequency and preferably wireless.

The means can be designed in such a way that the communications adapter can be connected to the operating device in a mechanical way, in particular by means of plug-, snapping-, clamping-, adhesive- and/or magnetic connections.

The communications adapter can be molded with a sealing compound. The sealing compound can at least partially shape the housing of the communications adapter.

The housing of the communications adapter can be sealed hermetically, especially water- or air-tight.

The communications adapter can consist of a bus interface for the communication with a bus and/or a supply interface.

The communications adapter can consist of a control unit and an antenna for the uni- or bi-directional communication with the at least one operating device.

The communications adapters can consist of a further communications interface. It can receive information, in particular maintenance and/or configuration data via the communication interface in a wired or wireless manner. The communications adapter can evaluate the received data via the communication interface by means of the control unit. The control unit can be designed to configure the communications adapter accordingly.

The communications adapter can implement the wireless communication that is coming from the operating device into a different wireless or wired standard and/or it can implement the communication addressed to the operating device from the wireless or wired standard for the wireless communication with the operating device.

In yet another aspect, a system with at least one operating device and at least one communications adapter is provided they were described before.

BRIEF DESCRIPTION OF THE DRAWINGS

The invention will now be described with reference to the figures. It is shown.

DETAILED DESCRIPTION

Figure 1:
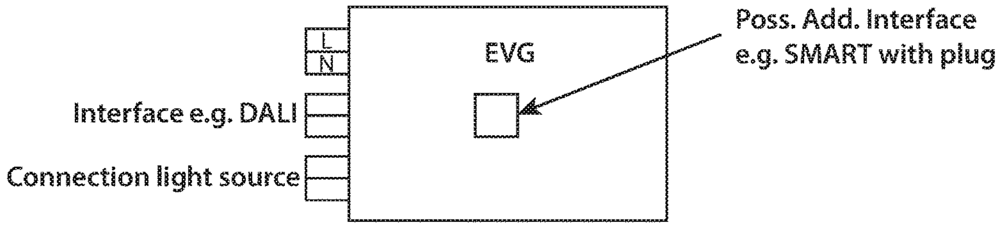
FIG. 1 an operating device according to the prior art.

According to the invention, an operating device with a housing for operating at least one light source and preferably at least one LED with a housing is now provided, which consists of means to mount a communications adapter.

These means can be e.g. a snapping-, clamping-, adhesive-, screwing- or similar connecting means and particularly magnetic connecting means, by means of which a correspondingly designed communications adapter can be positioned or mounted at the housing. Although primarily communications adapters are discussed in the following, it is to be understood that the embodiment according to the invention can be used for any component which should be functionally connected to the operating device, and which should in particular be supplied with electric power by it and/or which should exchange data with the operating device.

It is for example possible that magnetic and/or mechanical mounting brackets are used on the side of the operating device as well as on the side of the communications adapter, which work together when the operating device and the communications adapter are joined together in such a way, that the communications adapter is attached to the operating device or that it is held in a defined position. It is furthermore possible to use e.g. Velcro fasteners as connecting means or other connectors, which snap or clamp together when the communications adapter and the corresponding means of the operating device are joined together, in order to define the position of the communications adapter at the operating device.

The operating device is now designed in such a way that it consists of at least one interface that is designed for a wireless communication between the operating device and the communications adapter. Thus, it is possible that the operating device consists of particularly one antenna, which is mounted in the housing in such a way that it is possible to communicate through the housing of the operating device and in particular of the housing of the communications adapter. Correspondingly, the communications adapter also consists of an antenna in order to communicate with the operating device through the housing. The communication between the operating device and the communications adapter can be a uni- or a bi-directional communication.

In order to communicate, the operating device and/or the communications adapter consist of an intelligent circuit (IC, ASIC, or a microcontroller), which serves in particular only for the communication with the communication adapter/operating device.

The operating device can furthermore be particularly designed in such a way that it supplies the communications adapter wirelessly with energy. For example, an inductive energy transmission from the operating device to the communications adapter can be performed in order to supply the communications adapter with power. The operating device can vary or modulate the power supply in such a way, which is also provided without any direct contact that a communication with the communications adapter can be carried out by means of it. A communication between the operating device and the communications adapter that is based on e.g. a Powerline Communication (PLC) can thus be carried out.

The communications adapter is in particular configured in such a way that it can communicate with the operating device according to a protocol/standard on the one hand, but that it can also communicate by means of a deviating wireless or wired communication protocol/standard on the other hand. Thus, the communications adapter can be used for instance to provide a communication to a bus interface for the operating device.

The communications adapter can hereby be connected to a bus and consist of a corresponding bus interface for communicating (wirelessly and/or wired) with the bus on the one hand, while the communications adapter on the other hand comprises a communication interface for the wireless communication with the operating device. For example, the communications adapter can consist of an interface for a DALI and/or DSI bus on the one hand, while the communication adapter on the other hand communicates with the operating device by means of BTLE, Wi-Fi/WLAN, ZigBee or NFC.

The communications adapter can also consist of connectors for a programming device, in order to e.g. update the firmware of the operating device (modification or supplementing of the operational behavior, e.g. of the control or detection of new errors, or extension of the command set with regards to new functions of the operation and of the service) or in order to adjust operational parameters by means of the programming device. The programming device can communicate with the communications adapter in a wireless and/or wired manner.

It may be advantageous if the radio path between the operating device and the communications adapter also provides a very high galvanic isolation, for example in the range of 12,000 volts. This is particularly advantageous for an outdoor application.

In addition to communication interfaces for communication of the operating device with one or more communications adapters, the operating device preferably consists of another interface, by means of which the operating device can communicate in particular independently from a communications adapter. It is e.g. possible to supply the operating device particularly with maintenance or configuration information via the interface, which can the transmitted to the operating device wirelessly by means of e.g. a (mobile) end device.

Thus, the additional communication interface provides an additional and further communication channel for the operating unit. This communication channel or the corresponding interfaces may differ from the communication interface, which is intended for the communication with the at least one communications adapter. It should be understood that various communication interfaces can be provided for different communication adapters.

The provision of an additional communication channel is also advantageous because in this way a communication with the operating device or its configuration is possible, even if a communications adapter is not yet connected to the operating device. But if the operating device and the communications adapter as well as the mobile end device use the same communication protocol or communication method (e.g. BLE, Bluetooth, NFC, . . . ), it is possible that the communication between the end device (e.g. smartphone, tablet, . . . ), operating device and/or communications adapter is performed via the same communication interface. It is also possible that a factory default setting/configuration of the operating device is carried out.

The communications adapter can be particularly designed for the purpose to create a connection of the operating device with one or more sensors. It is thus possible that the communications adapter is connected to a sensor in a wireless or wired manner on the one hand, and that it can communicate with the operating device via a radio frequency on the other hand. Thus, an event that is detected by a sensor can be passed on to the operating device wirelessly. On the other hand, the operating unit can actively obtain information from the sensor.

The sensor can for instance be a daylight sensor, a motion sensor, a smoke detector, an infrared sensor (IR) and/or a combination of these. It is of course also possible to use other sensors (e.g. pressure and/or temperature sensors), which are especially known from the field of building technology.

Advantageously, the at least one communications adapter is hereby connected to the housing of the operating device. It is thus e.g. possible that a communication between the communications adapter and the operating device is performed by means of the NFC standard, whereby an optimal positioning of the antennas towards each other is accomplished by means of the connection. The antennas can thus be arranged or aligned in such a way that they are particularly only separated by a housing wall and/or wall of the communications adapter at most.

It is of course also possible that the operating device is designed with an interface that is accessible from the outside, in order to e.g. connect the operating device with a communication bus. This interface is then appropriately sealed in such a manner, that the requirements for an outdoor use (IP protection class) can be met. However, the operating device can be advantageous designed in such a way that only power lines for the electrical power supply of the operating device and for the light source are reaching through the housing towards the outside. Advantageously, the operating device consists of only one contactless interface, a communication between e.g. the communications adapter and the operating device is thus carried out by means of a wireless communication. Preferably, there is no wired interface that reaches through the housing towards the outside.

In addition to the contactless transmission of information, there is preferably also a contactless transmission of power between the communications adapter and the operating device, e.g. by means of an electromagnetic energy transmission. The connection and optimal power transmission can be accomplished by means of an optimal positioning of the power transmitters towards each other. For an electromagnetic transmission, it is e.g. possible to predetermine the position of the U- or toroidal halves towards each other, in order to ensure an optimal magnetic flow. The antennas and/or the energy transmitters are accommodated in the operating device and in the components, respectively.

When the operating device is connected to a power supply, it is possible to carry out a communication with the operating device by means of a modulation of the power supply e.g. via a Powerline Communication (PLC). In this way it is also possible to e.g. transmit dimming commands to the operating device. On the other hand, the transmission of such commands can also be accomplished from the communications adapter, when it e.g. receives the appropriate information. Corresponding commands can also be transmitted from the end device to the operating device.

If the communications adapter connects a sensor to the operating device, the operating device can also configure the sensor by way of a bi-directional communication via the wireless connection. As another example for connecting a wired communication protocol via a communications adapter, the Intra-Luminaire-Bus Protocol (ILB) can be mentioned at this point.

By means of the communications adapter it is also possible to directly read-out parameters from the operating device or information that is reflecting these. A corresponding read-out unit or a device for monitoring an operating device can thus be connected to the communications adapter, which determines transmitted electrical parameters of the operating device in a wireless manner. The end device may hereby also service as the read-out unit or corresponding information can be passed on via the communications adapter (relay) e.g. to a device bus (DALI, Dst, . . . ) and/or by means of another communication protocol.

For outdoor usage the operating device and preferably also part of the power lines for the power supply can be molded with the sealing compound. This is advantageous because it will guarantee that the components in the operating device are hermetically sealed from the environment. It should be noted however that it is possible that the power supply of the operating device can also be provided wirelessly, e.g. by means of induction. Thus, the operating device can be mechanically mounted e.g. inside a lamp or on a surface, while the power supply is provided wirelessly. Advantageously, no physical penetration of the housing of the operating device is required in this way.

In one embodiment, the sealing compound can form at least part of the housing of the operating device. Particularly the operating device and the parts that are associated to it can be inserted into a form, which defines the outer texture or the external characteristics and in particular the mounting brackets that will be provided on the housing or appropriate preparatory shapes. After the sealing compound (e.g. a plastic material) is inserted in the form, the outer surface of the sealing compound constitutes the surface of the housing after the sealing compound has hardened.

The operating device can communicate with other devices that are also connected to the power supply via the power lines that supply power to the operating device, e.g. by means of Powerline Communication. A corresponding communication is also possible with an inductive power supply.

The communications adapter may be designed in an analog way. Thus, the communications adapter can also consist of means for a mechanical positioning on the operating device, which represent corresponding counterparts to the means that are located on the operating device.

The communication interface of the communications adapter, but also particularly the one of the operating device, are hereby arranged within the housing. The communications adapter can also be equipped with a housing that is at least partially shaped by a sealing compound.

Just like the operating device, the communications adapter can also consist of a supply interface which hereby serves to receive the electrical power that was transmitted from the operating device in order to provide power to the communications adapter. For example, the transmission can be carried out inductively by means of a transformer/transducer, in which a primary transformer coil is located inside of the operating device and the secondary transformer coil is intended inside of the communications adapter or at a wiring which leads to the communications adapter.

The operating device/communications adapter can also consist of a capacitor or a battery, which provides the power supply on the one hand and which stores the transmitted electrical energy on the other hand. In line with this, the communications adapter can also inform the operating device about the charging status of the energy storage device, so that the operating device can interrupt or start the power supply of the communications adapter when corresponding information has been transmitted (sufficient or critical charging status). The communications adapter can in turn then use the means used for the power supply, for example, a transformer coil, in order to transmit information and/or electrical power to the operating device or to receive such from the operating device. This can be accomplished by means of e.g. a modulating or varying of the electrical current that is flowing through the coil or of the voltage that is applied to it.

The housing of the communications adapter can thereby be sealed hermetically from the environment, especially water- or air-tight, just like the housing of the operating device. But it can also be designed that only data is transmitted uni- or bi-directionally between the operating device and the communications adapter, while the power supply of the communications adapter is carried out in particular by means of a device bus that is connected to it. Furthermore, a separate power supply can be used for the communications adapter.

The communications adapter can provide a separate communication channel, just like the operating device, by means of which e.g. a communication with the end device, such as e.g. a control unit or another operating device, can be carried out. The communications adapter can be specifically set up to receive maintenance and/or configuration data via this separate communication channel. Thus, a further interface can be used for the communication channel in the communications adapter.

The maintenance and/or configuration information that was transmitted to the communications adapter can thereby be evaluated by the control unit in the configuration adapter (analog like in the operating device). Based on the evaluation by means of the control unit, a configuration or adjustment of the operating parameters of the communications adapter is then carried out.

The communications adapter thus particularly serves to communicate with the operating device on the one hand, but on the other hand to carry out a communication that is based on different standards and that can particularly be carried out not only in a wireless, but also in a wired manner.

As mentioned beforehand, the operating device can be an electronic ballast unit (EB, Mengenlaufer) or a LED converter. By means of using at least one communications adapter, the operating device can communicate according to various communication standards. The operating device can particularly create a communication network in its immediate vicinity (e.g. by using Near-Field Communication (NFC) or radio frequency). This communication network can be based on a radio standard or it can also be set up via the power lines (PLC). The networking can hereby be automatically based on well-known standards (Zeroconf, UPnP, Bonjour, Multicast, DHCP, SSDP, etc.). E.g. sensors or interface modules can be arranged in the network, by means of which the operating device can set up a communication.

When supplying the at least one communications adapter from the operating device, or when supplying other components, the electrical power that is passed on by the operating device can be controlled automatically e.g. by means of inductive coupling. For example, a pulse-width modulation (PWM) can be used for this purpose. The cables for the power supply of the operating device and of the light source are then particularly connected to the housing or to the operating device in such a way that no water or air can penetrate at the connection points. In particular the electrical supply lines are sealing the housing water- or air-tight. As stated earlier, a data transmission via a supply transmission can be carried out by means of a modulating of the supply voltage or by a coupling of the wireless signal.

When using an appropriate wireless standard (e.g. Bluetooth low energy (BTLE)/Bluetooth standard 4.0, or higher), which is used for the communication between the operating device and other components, it is also possible to directly access the operating device via other devices, such as e.g. mobile end devices (smartphone, handheld, tablet PC), in order to e.g. carry out a start-up or maintenance. The operating device can thus also be configured or the operating parameters can be set or adjusted. The invention thus offers the possibility that functions of the operating device can be outsourced into external components or adapters and that a communication according to different standards (Bluetooth, BTLE, ZigBee, Wi-Fi, IPV4, IPVG, 6WLoPan, DALI, LON, EIB, TELA Protocol . . . ) can be used between the components/adapters, and other bus devices, for example, in a light management system or in an outdoor light control/maintenance system, and on the other hand that a communication between the operating device and the components/adapters is always carried out based on a specific standards such as Bluetooth, B(T)LE.

For the contactless or wireless supply of the components/adapters by the operating device, it is possible to use a half ring-, E- or U-core with one or more windings inside the operating device and inside the housing. The means for positioning or mounting of components/adapters at the housing now serves to ensure a maximum magnetic flow between a winding in the operating device and a corresponding winding in the communications adapter/component. Thus, it is also possible to use the operating device according to the invention in areas, in which a high protection class (e.g. IP68) is required.

Inside of the communications adapter which is to be connected to the operating device or inside of the component that is to be connected to the operating device, another (half) ring-, E- or U-core is to be provided as well, in order to receive the electrical power that is to be transmitted by the operating device.

FIG. 1 now schematically depicts an operating device according to the prior art. It can be observed in it that in addition to the power supply, an interface to a bus as well as an interface for a connection to a light source is also reaching towards the outside of the operating device.

Figure 2:
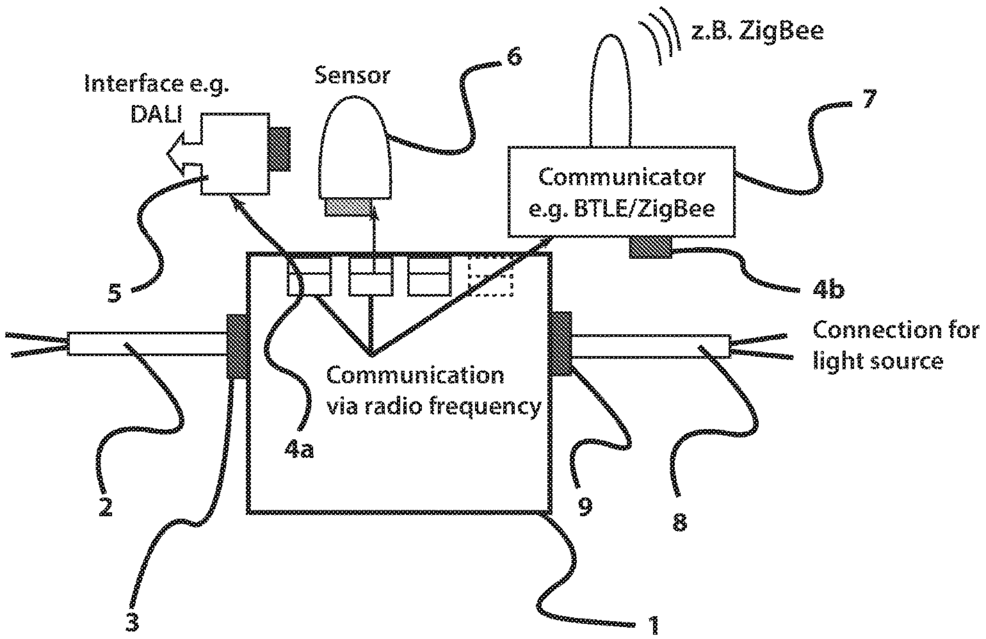
FIG. 2 an operating device according to the invention in a schematic way.

In FIG. 2 on the other hand, an operating device according to the invention is depicted. FIG. 2 depicts the operating device 1, which is supplied with power via an input line 2, for example, via a 230V or 380V AC power grid, which is connected to the operating device at an input 3 in such a way that an air- or water-tight sealing is accomplished between the input line 2 and the operating device 1. In particular the penetration of moisture is prevented at input 3.

The operating device 1 further consists of means 4*a*, that are designed to position or hold communications adapters or components that are to be connected to the operating device 1. FIG. 2 depicts a first exemplified communications adapter 5, which communicates with the operating device 1 via radio frequency on the one hand, and which provides an interface for a communication with a bus (e.g. DALI) on the other hand.

Further, a sensor module 6 is shown, which also communicates with the operating device via a radio frequency and which can also be electrically powered by the operating device.

Finally, a further communications adapter 7 is shown which also communicates with the operating device 1 via radio frequency on the one hand, but which on the other hand also enables a wireless communication, e.g. via another radio standard (e.g. ZigBee) or another wireless communication such as e.g. infrared or visible light. The further communications adapter 7 can of course also be made in such a way that it is designed on its secondary side in order to be able to communicate with other wireless communication protocols (Bluetooth, WLAN, . . . ).

Furthermore, by means of a dashed line in FIG. 2, a further mounting position for another communications adapter or for a further component is depicted.

The operating device further consists of an output line 8, which is intended for the connection of the light sources. Output line 8 is hereby connected to one output 9 of the operating device and is also protected against moisture and is particularly connected to the operating device in a water- and/or air-tight manner.

Input line 2 and output line 8 form respective power lines that are connected to the operating device.

Schematic mounting brackets 4*b* are depicted on the exemplified communications adapter 5, 7 and at the sensor module 6, which work together with the means 4*a* of operating device 1.

According to the invention, operating device 1 as well as communications adapter 5, 7 or component 6 (e.g. a sensor module) are arranged inside of a lamp or the operating device is arranged inside of a lamp and the adapters or components in the vicinity of the lamp. Thus, an operating device can be provided, which can be connected to a variety of bus protocols by means of different adapters (LUXMATE bus, LON, EIB, ILB, etc.), so that fewer variants of operating devices have to be produced. Thus, it is possible to realize different and flexible lamp arrangements by means of one 'base operating device' and it is possible to support different communication standards as well as standards for sensors and interfaces in a simple way.

Figure 3:
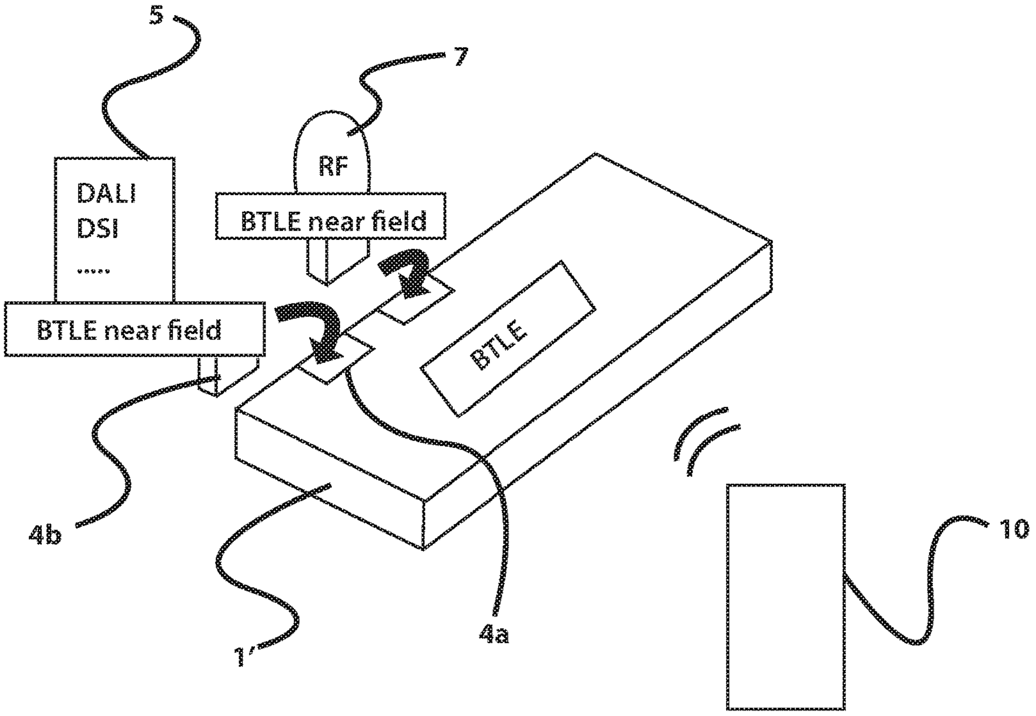
FIG. 3 an embodiment of the operating device according to the invention in a schematic way.

FIG. 3 exemplifies an operating device 1' with a communications adapter 5 (for a wired, preferably digital light management system, such as e.g. DALI, DSI or DMX) and a communications adapter 7 (RF, e.g. for a wireless communication), whereby a power supply of the operating device in the example is carried out inductively. Alternatively, the operating device 1' can also be supplied in a wired way via power lines.

Additionally, a mobile end device 10 is shown, which also communicates with the operating device 1, 1', preferably via a separate communication interface and particularly in a wireless manner. The mobile end device 10 can alternatively also communicate wirelessly with the communications adapter 7. It can be understood that the at least one light source can also be coupled to operating device 1, 1' in a wireless or inductive manner and that a wireless power supply of the at least one light source can be accomplished in this way. The light source can, for example, also be arranged as an integral part inside of operating device 1, 1' so that no wireless power supply is required for the light source.

The communication between operating device 1' and communications adapter 5 as well as communications adapter 7 can be carried out by means of Bluetooth low energy (BTLE).

Due to the wireless communication and the wireless power supply, the wiring effort will also decrease, which in turn reduces the susceptibility to errors. An adaptation to new communication standards is therefore possible without substantial changes to the operating device, because only a communications adapter has to be adjusted or designed accordingly. A subsequent amendment of the operating device with additional components or additional adapters is possible by means of the embodiment according to the invention, since additional functions can be upgraded by means of the wireless connection. Additionally, by means of the provision of a separate communication interface in the operating device for configuration or maintenance, which is preferably based on a Bluetooth standard, access to the operating device without any special devices, but rather by means of current smartphones, is possible.

The invention claimed is:

1. An encased operating device for the operation of light sources, comprising:

a housing having a housing wall, said housing being sealed against moisture;

a communication interface of the operating device located within the housing; and means for mechanically positioning at least one communication adapter on the housing, whereby said means are arranged on the housing in such a way that said at least one communication adapter is positioned to communicate wirelessly through the housing wall with the communication interface of the operating device that is within the housing, and the operating device is to supply electric power to the at least one communication adapter in a wireless manner via the communication interface without any direct physical contact;

wherein the operating device via the communications interface and the at least one communication adapter controls the operation of the respective light sources in a dimmable manner.

2. The operating device according to claim 1, wherein the light sources are LEDs.

3. The operating device according to claim 1, whereby the operating device is designed in order to communicate with the at least one communication adapter, the operating device is to receive data from the at least one communication adapter and transmit data to the at least one communication adapter.

4. The operating device according to claim 1, whereby the operating device is designed to communicate with the at least one communication adapter while the at least one communication adapter is supplied in a wireless manner by means using the wireless supply, in particular by varying or modulating the wireless supply.

5. The operating device claim 1, whereby the operating device is designed to communicate with the at least one communications adapter via a radio frequency.

6. The operating device according to claim 1, whereby said means are designed in such a way that the at least one communication adapter is to be positioned at the operating device by one of plugging, snapping, clamping, adhering or magnetically attaching the at least one communication adapter to the housing.

7. The operating device according to claim 1, whereby the operating device and the power lines that supply the operating device are at least partially molded with the sealing compound, and whereby the housing is at least partially shaped by the sealing compound.

8. The operating device according to claim 1, whereby the housing of the operating device is sealed hermetically, and is watertight.

9. The operating device according to claim 1, whereby the operating device is designed to communicate with other operating devices and with other bus modules via the power lines that are supplying the operating device by means of power line communication (PLC).

10. The operating device according to claim 1, whereby the operating device consists of a bus interface for the communication with a bus.

11. The operating device according to claim 1, whereby the operating device consists of a control unit and an antenna for the uni- or bi directional communication with the at least one communication adapter.

12. The operating device according to claim 1, whereby the operating device consists of a further communication interface designed to transmit and receive wireless data for maintenance and configuration, whereby the operating device is further designed to evaluate the data that was received via the communication interface by a control unit.

13. A lamp with an operating device according to claim 1.

14. A communication adapter which consists of a housing that is sealed against moisture and that is equipped with means for mechanical positioning at an operating device according to claim 1, whereby the communication adapter consists of an interface that is designed to communicate with an interface of the operating device within the housing of the operating device in a wireless manner.

15. The communication adapter according to claim 14, whereby the communication adapter is designed in order to communicate with the at least one operating device, to receive data from the at least one operating device and transmit data to the at least one operating device.

16. The communication adapter according to claim 14, whereby the communication adapter is designed in order to communicate with the operating device when there is a wireless power supply by the operating device in particular by means of varying or modulating of the wireless supply.

17. The communication adapter according to claim 14, whereby said means are designed in such a way that the communication adapter is to be connected to the operating device by one of plugging, snapping, clamping, adhering or magnetically attaching the at least one communication adapter to the housing.

18. The communication adapter according to claim 14, whereby the communication adapter is partially molded with the sealing compound, and whereby the housing of the communication adapter is at least partially shaped by the sealing compound.

19. The communication adapter according to claim 14, whereby the housing of the communication adapter is sealed hermetically and is water tight.

20. The communication adapter according to claim 14, whereby the communication adapter consists of a bus interface for the communication with a bus.

21. The communication adapter according to claim 14, whereby the communication adapter consists of a further communication interface, and is designed to transmit and receive wireless data for maintenance and configuration data, and whereby the communication adapter is further designed to evaluate the data that was received via the communication interface by means of the control unit, and whereby the control unit is designed to configure the communication adapter accordingly.

22. A system for the operation of light sources, comprising:

at least one light source;

at least one operating device having an encased housing with a housing wall, said housing being sealed against moisture;

at least one communication adapter having a housing that is sealed against moisture and having an adapter antenna located within the adapter housing;

a communication interface of the operating device located within the housing of the operating device;

an interface antenna located within the housing of the operating device; and means for mechanically positioning the at least one communication adapter on the housing of the operating device, whereby said means are arranged on the housing of the operating device in such a way that said at least one communication adapter is positioned to communicate wirelessly via the adapter antenna through the housing wall with the interface antenna and the communication interface that is within the housing of the operating device, and the operating device is to supply electric power to the at least one communication adapter in a wireless manner via the communication interface without any direct physical contact;

wherein the operating device via the communication interface and the at least one communication adapter controls the operation of the respective light sources in a dimmable manner.

23. The system according to claim 22 wherein the communication adapter is wired to a digital light management system having a bus that provides electric power to the at least one light source.

24. The system according to claim 22 wherein the communication adapter communicates wirelessly to a light management system that provides electric power to the at least one light source.

25. The system according to claim 22 wherein the light sources are LEDs.

26. The system according to claim 22 wherein said means for mechanically positioning at least one adapter on the housing of the operating device comprises a bracket.

27. The system according to claim 22 further comprising a primary transformer coil located within the housing for the operating device and a secondary transformer coil located in the adapter housing, wherein electric power is transmitted via an electromagnetic field between the coils from the operating device to the communication adapter.

* * * * *